(12) United States Patent
Eoff et al.

(10) Patent No.: US 11,608,461 B2
(45) Date of Patent: Mar. 21, 2023

(54) CONFORMANCE FOR CARBONATE FORMATIONS

(71) Applicant: Halliburton Energy Services, Inc., Houston, TX (US)

(72) Inventors: Larry Steven Eoff, Porter, TX (US); Aaron Michael Beuterbaugh, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/036,483

(22) Filed: Sep. 29, 2020

(65) Prior Publication Data

US 2022/0098465 A1 Mar. 31, 2022

(51) Int. Cl.
*C09K 8/12* (2006.01)
*C09K 8/508* (2006.01)
*C09K 8/504* (2006.01)

(52) U.S. Cl.
CPC ............... *C09K 8/12* (2013.01); *C09K 8/508* (2013.01); *C09K 8/5045* (2013.01)

(58) Field of Classification Search
CPC ... C09K 8/12; C09K 8/22; C09K 8/24; C09K 8/40; C09K 8/42; C09K 8/50; C09K 8/5045; C09K 8/508; C09K 8/5083; C09K 8/5086; C09K 8/516; C09K 8/56; C09K 8/57; C09K 8/5751; C09K 8/5753; C09K 8/5755; C09K 8/5756; E21B 33/13; E21B 33/138
See application file for complete search history.

(56) References Cited

U.S. PATENT DOCUMENTS

| 4,335,109 | A | * | 6/1982 | Hill | ................ A01N 59/06 106/15.05 |
| 5,669,456 | A | * | 9/1997 | Audibert | ................ C09K 8/90 507/216 |
| 6,476,169 | B1 | | 11/2002 | Eoff et al. | |
| 7,114,568 | B2 | | 10/2006 | Eoff et al. | |
| 7,182,136 | B2 | | 2/2007 | Dalrymple et al. | |

(Continued)

FOREIGN PATENT DOCUMENTS

| WO | WO 2009/083264 A1 * | 7/2009 | ............ C09K 8/56 |
| WO | WO-2018203884 A1 * | 11/2018 | ........... E21B 33/138 |
| WO | WO-2020236176 A1 * | 11/2020 | ........... C07C 237/06 |

OTHER PUBLICATIONS

Foreign Communication from Related Application—International Search Report and Written Opinion of the International Searching Authority, International Application No. PCT/US2021/027192, dated Aug. 3, 2021, 9 pages.

(Continued)

*Primary Examiner* — Angela M DiTrani Leff
(74) *Attorney, Agent, or Firm* — Conley Rose, P.C.; Rodney B. Carroll

(57) ABSTRACT

A method of servicing a wellbore in a subterranean formation comprising: placing components of a wellbore servicing fluid in the wellbore and/or subterranean formation, wherein the components comprise a hydrophobically modified relative permeability modifier, a metal carbonate surface modifier, and a (e.g., aqueous) base fluid; and allowing the wellbore servicing fluid to modify the permeability of at least a portion of the wellbore and/or subterranean formation.

19 Claims, 2 Drawing Sheets

(56) References Cited

U.S. PATENT DOCUMENTS

| | | | |
|---|---|---|---|
| 7,431,089 B1* | 10/2008 | Couillet | E21B 43/283 |
| | | | 166/307 |
| 7,493,957 B2 | 2/2009 | Nguyen et al. | |
| 7,595,283 B2 | 9/2009 | Eoff et al. | |
| 7,759,292 B2 | 7/2010 | Eoff et al. | |
| 7,998,910 B2 | 8/2011 | Todd | |
| 8,387,694 B2 | 3/2013 | Dalrymple et al. | |
| 8,420,576 B2 | 4/2013 | Eoff et al. | |
| 8,962,535 B2 | 2/2015 | Welton et al. | |
| 9,441,151 B2 | 9/2016 | Reddy et al. | |
| 9,598,631 B2* | 3/2017 | Recio, III | C09K 8/885 |
| 10,077,397 B2 | 9/2018 | Reddy et al. | |
| 2005/0000694 A1 | 1/2005 | Dalrymple et al. | |
| 2008/0110624 A1* | 5/2008 | Nguyen et al. | E21B 43/26 |
| 2009/0291863 A1* | 11/2009 | Welton | C09K 8/74 |
| | | | 507/219 |
| 2010/0012331 A1* | 1/2010 | Larter | E21B 43/243 |
| | | | 166/401 |
| 2011/0034351 A1 | 2/2011 | Eoff et al. | |
| 2011/0114314 A1 | 5/2011 | Wang et al. | |
| 2012/0135895 A1 | 5/2012 | Eoff | |
| 2014/0338907 A1* | 11/2014 | Reddy | C09K 8/68 |
| | | | 166/282 |
| 2016/0244660 A1* | 8/2016 | Beuterbaugh | C09K 8/74 |
| 2016/0326425 A1 | 11/2016 | Reddy et al. | |
| 2017/0002262 A1 | 1/2017 | Recio, III et al. | |
| 2019/0330522 A1 | 10/2019 | Hoyles et al. | |
| 2020/0002603 A1* | 1/2020 | Eoff | C09K 8/76 |

OTHER PUBLICATIONS

Qin, Liming et al., "Mechanistic Aspects of Polymeric Relative Permeability Modifier Adsorption onto Carbonate Rocks," Energy & Fuels, 2020, pp. 12065-12077, vol. 34, American Chemical Society Publications.

* cited by examiner

CONFORMANCE FOR CARBONATE FORMATIONS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally to methods of servicing a wellbore. More specifically, it relates to servicing a wellbore with a relative permeability modifier and a metal carbonate surface modifier.

BACKGROUND

Natural resources (e.g., oil or gas) residing in a subterranean formation can be recovered by driving resources from the formation into a wellbore using, for example, a pressure gradient that exists between the formation and the wellbore, the force of gravity, displacement of the resources from the formation using a pump or the force of another fluid injected into the well or an adjacent well. The production of fluid in the formation can be increased by hydraulically fracturing the formation. That is, a treatment fluid (e.g., a fracturing fluid) can be pumped down the wellbore at a rate and a pressure sufficient to form fractures that extend into the formation, providing additional pathways through which the oil or gas can flow to the well.

Subsequently, oil or gas residing in the subterranean formation can be recovered by driving the fluid into the well using, for example, a pressure gradient that exists between the formation and the wellbore, the force of gravity, displacement of the fluid using a pump or the force of another fluid injected into the well or an adjacent well. The production of the fluid in the formation can be increased by hydraulically fracturing the formation. That is, a fracturing fluid can be pumped down the casing to the formation at a rate and a pressure sufficient to form fractures that extend into the formation, providing additional pathways through which the oil or gas can flow to the well. Unfortunately, water along with oil or gas can eventually be produced by the formation through the fractures therein. In such cases, the formation can be treated with a relative permeability modifier (RPM) that is meant to control water production, shut off water-producing intervals, and/or enhance hydrocarbon production. A particularly effective RPM material for such applications includes water-soluble polymers that are hydrophobically modified with suitable hydrocarbon groups.

A challenge to the use of hydrophobically modified RPMs (HMRPMs) is that some of HMRPMs lose their effectiveness to control or shutoff water production under certain conditions including, for example, the temperature at a downhole pH and salinity exceeding the lower critical solution temperature (LCST) of the polymer. For example, at temperatures greater than about 140° F. and at a pH of greater than about 7, some HMRPMs can precipitate out of solution limiting their effectiveness as relative permeability modifiers. Precipitation of the RPM not only substantially terminates its relative permeability-modifying properties, but also can damage a subterranean formation if the precipitation occurs downhole.

Furthermore, conventional RPMs fail to maintain relative permeability modification (e.g., brine permeability reduction) in carbonate formations. Without being limited by theory, this may be due to desorption of the RPM from the formation surface.

Accordingly, an ongoing need exists for improved RPM compositions and methods for utilizing such RPMs in subterranean formations, including carbonate formations, during wellbore servicing operations.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods can be implemented using any number of techniques, whether currently known or in existence. The disclosure should in no way be limited to the illustrative implementations, drawings, and techniques below, including the exemplary designs and implementations illustrated and described herein, but can be modified within the scope of the appended claims along with their full scope of equivalents.

Disclosed herein are wellbore servicing fluids or compositions (collectively referred to herein as WSFs) and methods of using same. The WSF and method of this disclosure provide long term permeability reduction to aqueous fluid (e.g., water, brine) while maintaining permeability to oil. Via the WSFs and method of this disclosure, a permeability of a formation to aqueous fluids, such as water or brine (also referred to herein as a "water permeability" of a formation) can be reduced relatively more than a permeability of the formation to oil (also referred to herein as an "oil permeability" or "hydrocarbon permeability" of the formation).

Description of a method of servicing a wellbore in a subterranean formation according to this disclosure will now be made with reference to FIG. 1, which is a flow diagram of a method I of servicing a wellbore. As indicated at 100, method I comprises: placing components of a wellbore servicing fluid (WFSF) in the wellbore and/or subterranean formation, wherein the components comprise a hydrophobically modified relative permeability modifier (HMRPM), a metal carbonate surface modifier (MCSM), and an (e.g., aqueous) base fluid; and allowing the wellbore servicing fluid to modify (e.g., via interaction of the components of the WSF and/or the wellbore and/or subterranean formation) the permeability of at least a portion of the wellbore and/or subterranean formation. For example, once placed in the WB or subterranean formation, the MCSM can interact with the wellbore and/or subterranean formation and with the HMRPM to decrease a permeability of the wellbore and/or subterranean formation to water. A permeability of the wellbore and/or subterranean formation to oil is not concomitantly reduced and/or is not reduced as much as the water permeability is reduced.

The wellbore servicing fluid can reduce the water permeability of the at least the portion of the wellbore and/or subterranean formation by at least 10, 20, 30, 40, 50, 60, 70, 80, 90%, or more. In embodiments, placing the components of the WSF downhole does not reduce the oil permeability as much as the water permeability. For example, the wellbore servicing fluid can reduce the oil permeability of the at least the portion of the wellbore and/or subterranean formation by less than the reduction in water permeability, for example, by less than or equal to about 0, 5, 10, 20, 30, 40, or 50%.

Figure 1:
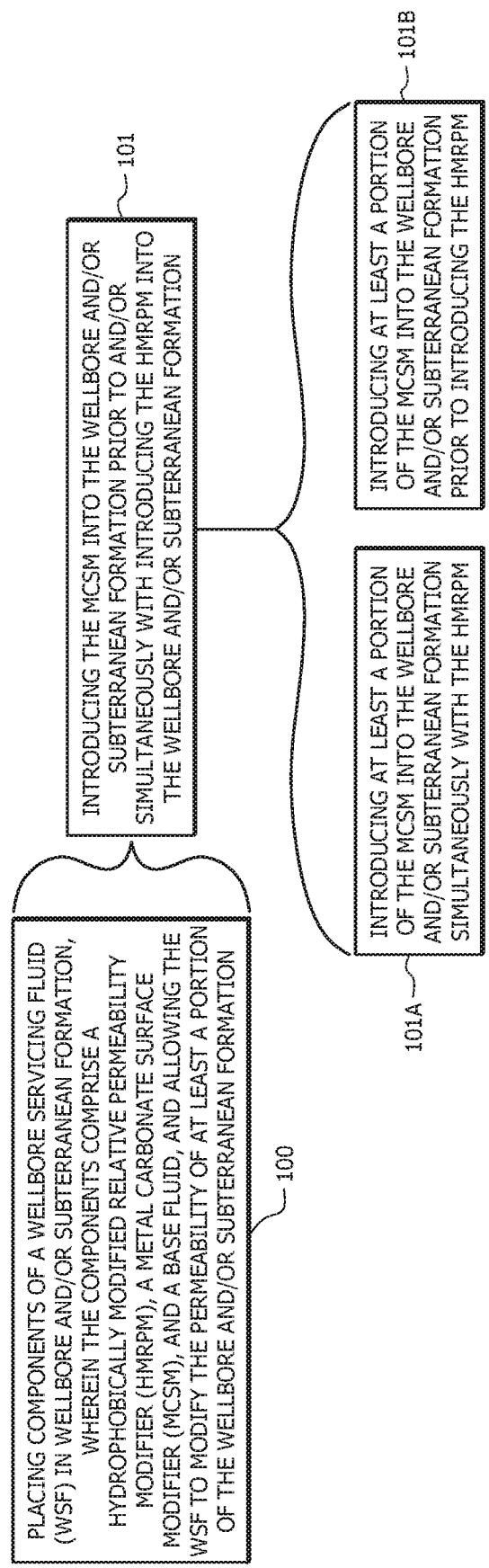
FIG. 1 is a flow diagram of a method of servicing a wellbore in a subterranean formation, according to embodiments of this disclosure.

As depicted at 101 in FIG. 1, placing the components of the WSF in the wellbore and/or subterranean formation can include introducing the MCSM into the wellbore and/or subterranean formation prior to and/or simultaneously with introducing the HMRPM into the wellbore and/or subterranean formation 101. For example, as indicated at 101A, in embodiments, placing the components of the WSF in the wellbore and/or subterranean formation comprises introducing at least a portion of the MCSM into the wellbore and/or subterranean formation simultaneously with the HMRPM, for example, by combining the aqueous base fluid, the HMRPM, and the at least the portion of the MCSM to form a solution of the WSF, and introducing the solution into the wellbore and/or subterranean formation. In such embodiments, the method can comprise combining all or a portion of the HMRPM, all or a portion of the MCSM, and all or a portion of the aqueous base fluid to form the WSF, and introducing the WSF into the wellbore and/or subterranean formation. Alternatively or additionally, as indicated at 101B, placing the components of the WSF in the wellbore and/or subterranean formation can comprise introducing at least a portion of the MCSM into the wellbore and/or subterranean formation prior to introducing the HMRPM into the wellbore and/or subterranean formation. In such latter embodiments, the method can comprise introducing all or the at least the portion of the MCSM into the wellbore and/or subterranean formation, optionally with all or a portion of the base fluid, and subsequently introducing the HMRPM into the wellbore and/or subterranean formation with any remaining base fluid.

In embodiments, the WSF can be prepared using any suitable method or process. The components of the WSF (e.g., HMRPM, MCSM, aqueous base fluid, salt, etc.) can be combined and mixed in by using any mixing device compatible with the composition, e.g., a mixer, a blender, etc. In embodiments, a pre-reacted HMRPM/oxygenated alkylating agent (OAA), as described hereinbelow, can be prepared separately and diluted to a desired concentration with an aqueous base fluid of the type used in the subsequent formation of the WSF.

Figure 2:
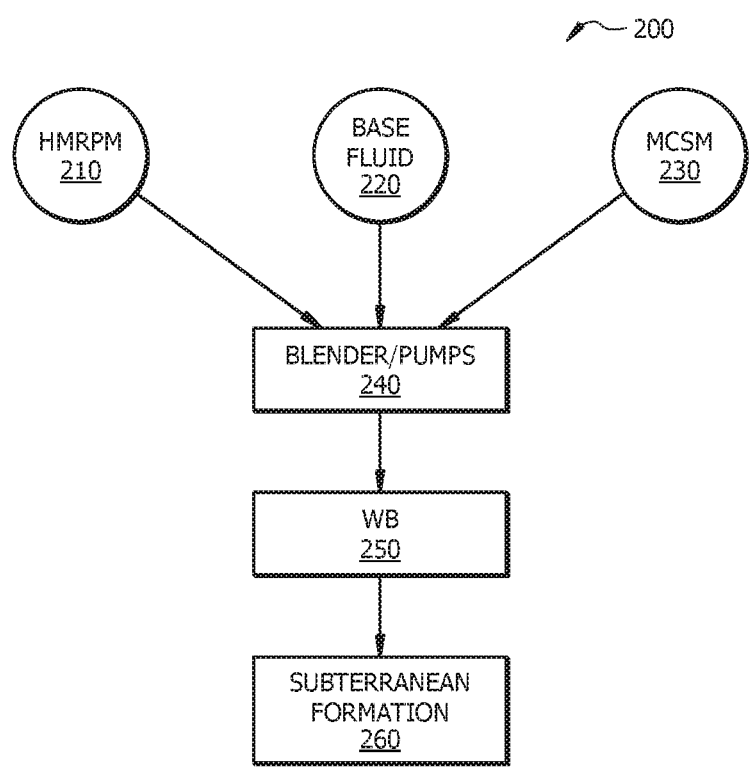
FIG. 2 is a schematic of a wellbore servicing system, according to embodiments of this disclosure.

With reference to FIG. 2, which is a schematic of a wellbore servicing system, according to embodiments of this disclosure, a blender and/or pumps 240 can be utilized to introduce the components of the WSF, including the HMRPM 210, the MCSM 230, and the base fluid 220, into the wellbore 250 and/or subterranean formation 260. As described above, the components (i.e., HMRPM 210, MCSM 230, and base fluid 220) can be combined and/or pumped separately via blenders/pumps 240 into the wellbore 250 and/or subterranean formation 260.

The WSF of this disclosure including HMRPM, MCSM, and base fluid components can be any suitable wellbore servicing fluid (WSF). As used herein, a "servicing fluid" or "treatment fluid" refers generally to any fluid that can be used in a subterranean application in conjunction with a desired function and/or for a desired purpose, including but not limited to fluids used to drill, complete, work over, fracture, repair, or in any way prepare a wellbore for the recovery of materials residing in a subterranean formation penetrated by the wellbore. Examples of wellbore servicing fluids include, but are not limited to, cement slurries, drilling fluids or muds, spacer fluids, lost circulation fluids, fracturing fluids, gravel packing fluids, diverting fluids, or completion fluids. The servicing fluid is for use in a wellbore that penetrates a subterranean formation. It is to be understood that "subterranean formation" encompasses both areas below exposed earth and areas below earth covered by water such as ocean or fresh water. In embodiments, and without limitation, the WSF can be a fracturing fluid, a gravel packing fluid, a stimulation fluid, an acidizing fluid, a conformance control fluid, a clay control fluid, a scale control fluid, an enhanced oil recovery fluid, a surfactant flooding fluid, an energized fluid, a secondary recovery fluid, an injection fluid, or a combination thereof.

In embodiments, the HMRPM and the MCSM can be added to the same base fluid and delivered into the wellbore as a single stream WSF. In embodiments, the HMRPM (e.g., a pre-reacted HMRPM/OAA, as described below) and/or the MCSM are manufactured (e.g., combined with base fluid) off-site. In alternative embodiments, the HMRPM and MCSM are combined at the well site. For example, the HMRPM and MCSM can be contacted with each other at the well site prior to being introduced into the wellbore and/or subterranean formation. When manufactured or assembled off-site, the HMRPM (e.g., pre-reacted HMRPM/OAA) and/or the MCSM can be transported to the well site and combined with the other components to form a WSF, and/or can be introduced separately downhole.

When it is desirable to prepare a WSF of the type disclosed herein for use in a wellbore, a base (e.g., an aqueous base fluid) servicing fluid prepared at the well site or previously transported to and, if necessary, stored at the on-site location can be combined with the HMRPM, MCSM, additional base fluid (e.g., water, brine) and optional other additives to form the WSF. In embodiments, additional relative permeability modifiers (e.g., conventional relative permeability modifiers) can be added to the WSF (e.g., on-the-fly) along with the other components/additives. The resulting WSF can be pumped downhole where it can function as intended (e.g., modify the relative permeability of at least a portion of the subterranean formation). As noted above, WSFs of the type disclosed herein can be used in a variety of wellbore servicing operations, such as for example fracturing operations, gravel packing operations, enhanced oil recovery (EOR) operations, diversion operations, etc. In embodiments, the herein disclosed WSF and method of using same can provide long term aqueous fluid (e.g., brine, water) reduction in carbonate formations following acid jobs. In embodiments, the herein disclosed WSF and method of using same can provide long term water reduction via solids-free fluid loss pills comprising the HMRPM (e.g., HPT-1) and the MCSM. That is, in embodiments, the components are introduced into the wellbore and/or subterranean formation as a fluid loss pill containing one or more of the components.

In embodiments, the subterranean formation 260 comprises a metal carbonate. For example, the metal carbonate can include calcium carbonate, iron carbonate, magnesium calcium carbonate, strontium carbonate, calcite, dolomite, mixed carbonate/silicate, layered carbonate/silicate, or a combination thereof.

In embodiments, the method of this disclosure enables a water permeability reduction that is long lasting. For example, the method reduces the water permeability of the wellbore and/or subterranean formation for a time period of from greater than or equal to about 1 hour to greater than or equal to about 100 hours, alternatively greater than or equal to about 3 hours, alternatively greater than or equal to about 24 hours, alternatively greater than or equal to about 2 days, at the formation temperatures. In embodiments, the method reduces the water permeability of the wellbore and/or subterranean formation relative to (e.g., to a greater extent than) methods employing a WSF of similar composition comprising a HMRPM, but no MCSM. In some such embodiments, the method reduces the water permeability of the wellbore and/or subterranean formation by at least 10, 20, 30, 40, 50, 60, 70, 80, 90, 100%, or more relative to methods employing a WSF of similar composition comprising a HMRPM, but no MCSM. In embodiments, the method of this disclosure can be utilized to reduce the water permeability of the wellbore and/or subterranean formation semi- or substantially permanently, e.g., for a time period of greater than or equal to a day, a month, one year, two years, three years, four years, five years, or more.

As noted hereinabove, one of the components of the WSF is a metal carbonate surface modifier (MCSM). Without being limited by theory, the MCSM is referred to herein as a "metal carbonate surface modifier" because the MCSM is believed to alter a permeability of the WB and/or subterranean formation comprising calcium via interaction with the wellbore and/or subterranean formation and with the HMRPM, thus decreasing the water permeability thereof more than an oil permeability thereof. Although referred to as a MCSM, a WSF of this disclosure and method of using same may be utilized to benefit in other types of formations. In embodiments, the MCSM is water soluble (e.g., has a solubility in water in a range of from about 0.01 wt % to about 10 wt %, from about 0.1 wt % to about 10 wt %, from about 0.2 wt % to about 10 wt %, or greater than or equal to about 0.01 wt %, 0.1 wt %, 1 wt %, 2 wt %, 3 wt %, 4 wt %, or 5 wt % solubility in distilled water at room temperature). In embodiments, the MCSM is oil soluble (e.g., has a solubility in oil in a range of from about 0.01 wt % to about 10 wt %, from about 0.1 wt % to about 10 wt %, from about 0.2 wt % to about 10 wt %, or greater than or equal to about 0.01 wt %, 0.1 wt %, 1 wt %, 2 wt %, 3 wt %, 4 wt %, or 5 wt % solubility in oil at room temperature).

In embodiments, the MCSM is present in the WSF in an amount of from about 0.001 wt % to about 1 wt %, alternatively from about 0.01 wt % to about 0.5 wt %, or alternatively from about 0.05 wt % to about 0.1 wt %, based on the total weight of the WSF. In embodiments, the MCSM comprises a phosphate, a carboxylate, a silicate, a phosphonate carboxylate, or a combination thereof. By way of non-limiting examples, the MCSM can comprise sodium phosphate, zinc acetate, sodium silicate (e.g., INJECTROL® A), a phosphonate having a partially or fully neutralized aminodiacetic acid group (e.g., FDP 1355, which is a neutralized version of phosphonomethyliminodiacetic acid (PMIDA) prepared using KOH to create the potassium salt of PMIDA), or a combination thereof.

In embodiments, the WSF comprises a hydrophobically modified relative permeability modifier (HMRPM). HMRPMs herein refer to materials used to reduce a subterranean formation's effective permeability to water while minimally impacting the subterranean formation's effective permeability to oil and/or gas. In embodiments, the HMRPM comprises a water-soluble, hydrophobically modified polymer. Herein the disclosure can refer to a polymer and/or a polymeric material. It is to be understood that the terms polymer and/or polymeric material herein are used interchangeably and are meant to each refer to compositions comprising at least one polymerized monomer in the presence or absence of other additives traditionally included in such materials. The term "derivative" is defined herein to include any compound that is made from one or more of the HMRPMs, for example, by replacing one atom in the HMRPM with another atom or group of atoms, rearranging two or more atoms in the HMRPM, ionizing one of the HMRPMs, or creating a salt of one of the HMRPMs. The term "copolymer" as used herein is not limited to the combination of two monomers, but includes any combination of monomers, e.g., terpolymers, quadpolymers, and the like. The copolymers can be linear copolymers, branched copolymers, graft copolymers, block copolymers, dendritic copolymers, and the like. HMRPMs are described in more detail in U.S. Pat. Nos. 6,476,169; 7,114,568; 7,182,136; 7,493,957; 7,595,283; 7,759,292; 7,998,910; 8,387,694; 8,420,576; 8,962,535; 9,441,151; 10,077,397; U.S. Publications No. 2011/0034351 A1 and 2012/0135895 A1.

In embodiments, the HMRPM comprises a water-soluble, hydrophobically modified polymer (e.g., a water-soluble polymer with hydrophobic modification). The hydrophobically modified polymer can contain one or more substituents capable of reacting with an alkylating agent. Nonlimiting examples of substituents which are capable of reacting with an alkylating agent include amino groups, including primary, secondary and tertiary amine groups; hydroxyls; thiols; thioethers; carboxylates and activated methylene carbons adjacent to one or more carbonyl groups. As used herein, "water-soluble" refers to greater than or equal to about 0.0001 wt %, alternatively greater than or equal to about 0.001 wt %, alternatively greater than or equal to about 0.01 wt %, alternatively greater than or equal to about 0.1 wt %, or alternatively greater than or equal to about 1 wt % solubility in distilled water at room temperature. In embodiments, the water-soluble, hydrophobically modified polymer has a solubility in water in a range of from about 0.01 wt % to about 10 wt %, from about 0.1 wt % to about 10 wt %, from about 0.1 wt % to about 10 wt %, or greater than or equal to about 0.01 wt %, 0.1 wt %, or 1 wt %. A water-soluble polymer with hydrophobic modification is referred to herein as a "water-soluble, hydrophobically modified polymer." As used herein, the term "hydrophobic modification," or "hydrophobically modified," refers to the incorporation into a hydrophilic polymer structure of hydrophobic groups. As used herein, the term "hydrophobic modification," or "hydrophobically modified," refers to the incorporation into the hydrophilic polymer structure of hydrophobic groups comprising alkyl chain groups with a length of from about 6 to about 22 carbons, alternatively from about 10 to about 22 carbons, or alternatively from about 12 to about 18 carbons. While these hydrophobically modified polymers have hydrophobic groups incorporated into the hydrophilic polymer structure, those suitable for use in the present disclosure are water-soluble.

In embodiments, the HMRPM comprises a polyelectrolyte. Without being limited by theory, polyelectrolytes are polymers that contain ionic groups. In embodiments, the ionic groups of the polyelectrolyte can be cationic groups, anionic groups, zwitterionic groups, or any combination thereof. In some embodiments, the polyelectrolyte contains only cationic groups. In other embodiments, the polyelectrolyte contains only anionic groups. In some other embodiments, the polyelectrolyte contains only zwitterionic groups. In embodiments, the number of cationic groups exceeds the number of anionic groups in the polyelectrolyte. In embodiments, the number of anionic groups exceeds the number of cationic groups in the polyelectrolyte. In embodiments, the polyelectrolyte is electrically neutral due to the number of cationic groups being equal to the number of anionic groups, as would be the case when the charged groups are exclusively zwitterionic. In embodiments, the polyelectrolyte is non-ionic.

The water-soluble, hydrophobically modified polymers can be synthesized using any suitable method. In embodiments, the water-soluble, hydrophobically modified polymers can be a reaction product of a hydrophilic polymer and a hydrophobic compound, i.e., hydrophobic modification. Those of ordinary skill in the art, with the benefit of this disclosure, will be able to determine other suitable methods for the preparation of suitable water-soluble, hydrophobically modified polymers.

In embodiments, the HMRPM can be included within the WSF in a suitable amount. In embodiments, a HMRPM of the type disclosed herein can be present within the WSF in an amount of from about 0.01 wt % to about 10 wt %, alternatively from about 0.1 wt % to about 3 wt %, or alternatively from about 0.5 wt % to about 1 wt %, based on the total weight of the WSF.

In embodiments, the hydrophilic polymers suitable for use in this disclosure (e.g., suitable for a hydrophobic modification process) comprise acrylamide based polymers, hydrolyzed polyacrylamides, polyvinylamines, poly(vinylamines/vinyl alcohols), alkyl acrylate polymers, alkylamino acrylate polymers, alkylamino alkylacrylate polymers, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethyl-aminopropyl methacrylamide), poly(acrylic acid/dimethylaminopropyl methacrylamide), and poly(methacrylic acid/dimethylaminopropyl methacrylamide), or combinations thereof.

In some embodiments, the hydrophilic polymer can comprise a polymer backbone that contains a reactive amino group in the polymer backbone or as a pendant group, wherein the reactive amino group is capable of reacting with a hydrophobic compound and/or an oxygenated alkylating agent. In other embodiments, the hydrophilic polymer comprises a dialkyl amino pendant group. In other embodiments, the hydrophilic polymer can comprise a pendant group that comprises a dimethyl amino group, e.g., polymers comprising dimethylaminoethyl methacrylate or dimethylaminopropyl methacrylamide monomers. In some embodiments, a suitable hydrophilic polymer can be formed from monomers containing amine groups in an amount ranging from about 20 mole % to about 100 mole % of the monomers, alternatively from about 40 mole % to about 80 mole % of the monomers, or alternatively from about 50 mole % to about 75 mole % of the monomers.

In certain embodiments, a suitable hydrophilic polymer can comprise a polymer backbone comprising polar heteroatoms, such as for example oxygen, nitrogen, sulfur, phosphorous, or combinations thereof. Nonlimiting examples of hydrophilic polymers comprising polar heteroatoms within the polymer backbone suitable for use in the present disclosure include celluloses, chitosans, polyamides, polyetheramines, polyethyleneimines, polyhydroxyetheramines, polylysines, polysulfones, gums, starches, derivatives thereof, or combinations thereof.

In embodiments, hydrophobic compounds suitable for reacting with the hydrophilic polymers comprise alcohols; amines; epoxides; alkyl halides; alkyl sulfonates; alkyl sulfates; organic acids, such as for example octenyl succinic acid and dodecenyl succinic acid; organic acid derivatives, such as for example anhydrides thereof, esters thereof, imides thereof, amides thereof, acid halides thereof or combinations thereof. In some embodiments, the hydrophobic compounds comprise alkyl groups with a chain length ranging from about 6 to about 22 carbon atoms, alternatively from about 10 to about 22 carbons, or alternatively from about 12 to about 18 carbons.

When the hydrophobic compound is an alkyl halide, for example, the reaction between the hydrophobic compound and the hydrophilic polymer comprising amino groups can result in the quaternization of at least some of the hydrophilic polymer amino groups, wherein the alkyl chain length is from about 6 to about 22 carbons, alternatively from about 10 to about 22 carbons, or alternatively from about 12 to about 18 carbons.

In embodiments, the water-soluble, hydrophobically modified polymer comprises a hydrophilic monomer and a hydrophobic compound of the type described previously herein in a mole ratio ranging from about 99.98:0.02 to about 90:10 (hydrophilic monomer to hydrophobic compound), alternatively from about 80 to about 20, or alternatively from about 70 to about 30, wherein the hydrophilic monomer is a calculated amount present in the hydrophilic polymer.

Nonlimiting examples of hydrophilic monomers suitable for use in the present disclosure include acrylamide, 2-acrylamido-2-methyl propane sulfonic acid, N,N-dimethylacrylamide, vinyl pyrrolidone, dimethylaminoethyl methacrylate, dimethylaminoethyl methacrylamide, acrylic acid, dimethylaminopropyl methacrylamide, vinyl amine, vinyl acetate, trimethylammoniumethyl methacrylate chloride, methacrylamide, hydroxyethyl acrylate, hydroxymethylacrylate, hydroxyethylmethacrylate, polyethylene glycol acrylate, polyethylene glycol methacrylate, polypropylene glycol acrylate, polypropylene glycol methacrylate, alkyl amino methacrylate, N-hydroxymethylacrylamide, N-hydroxymethylmethacrylamide, vinyl sulfonic acid, vinyl phosphonic acid, methacrylic acid, vinyl caprolactam, N-vinylformamide, itaconic acid, styrene sulfonic acid, quaternary salt derivatives of acrylamide, quaternary salt derivatives of acrylic acid, methacrylamidoethyltrimethyl ammonium halide, N,N-diallylacetamide, dimethyldiallyl ammonium halide, or combinations thereof. For purposes of this disclosure herein, a halide can comprise chloride, bromide, iodide, or a halide equivalent, such as for example toluenesulfonate (i.e., tosylate) or methanesulfonate (i.e., mesylate), or combinations thereof.

In embodiments, the water-soluble, hydrophobically modified polymer can be prepared from a polymerization reaction comprising a hydrophilic monomer and/or a hydrophobically modified hydrophilic monomer. Methods for preparing water-soluble, hydrophobically modified polymers are described in more detail in, for example, U.S. Pat. No. 6,476,169. Those of ordinary skill in the art, with the benefit of this disclosure, will be able to determine other suitable methods for the synthesis of suitable water-soluble, hydrophobically modified polymers. The hydrophobically modified hydrophilic monomer can be a reaction product of a hydrophilic monomer and a hydrophobic compound of the type previously described herein. In embodiments, the hydrophobically modified hydrophilic monomers comprise alkyl acrylates, alkyl methacrylates, alkyl acrylamides, alkyl methacrylamides, alkyl dimethylammoniumethyl methacrylate halides, alkyl dimethylammoniumethyl methacrylamide halides, alkyl dimethylammoniumpropyl methacrylate halides, alkyl dimethylammoniumpropyl methacrylamide halides, or combinations thereof. In such embodiments, the alkyl groups comprise from about 6 to about 22 carbon atoms, alternatively from about 10 to about 22 carbons, or alternatively from about 12 to about 18 carbons. In embodiments, the hydrophobically modified hydrophilic monomer comprises octadecyldimethylammoniumethyl methacrylate bromide, hexadecyldimethylammoniumethyl methacrylate bromide, octadecyldimethylammoniumethyl methacrylamide bromide, hexadecyldimethylammoniumpropyl methacrylamide bromide, 2-ethylhexyl methacrylate, octadecyl methacrylamide, hexadecyl methacrylamide, or combinations thereof.

In embodiments, the water-soluble, hydrophobically modified polymers comprise hydrophobically modified poly(dimethylaminoethyl methacrylate), hydrophobically modified poly(dimethylaminopropyl methacrylamide), poly(alkyldimethylammoniumethyl methacrylate), poly(octadecyldimethylammoniumethyl methacrylate), poly(hexadecyldimethylammoniumethyl methacrylate), poly(octadecyldimethylammoniumethyl methacrylamide), poly(hexadecyldimethyl-ammoniumpropyl methacrylamide), acrylamide/octadecyldimethylammoniumethyl methacrylate bromide copolymer, dimethylaminoethyl methacrylate/vinyl pyrrolidone/hexadecyldimethyl-ammoniumethyl methacrylate bromide terpolymer, acrylamide/2-acrylamido-2-methyl propane sulfonic acid/2-ethylhexyl methacrylate terpolymer, amino methacrylate/alkyl amino methacrylate copolymer, dimethylaminoethyl methacrylate/alkyl-dimethylammoniumethyl methacrylate copolymer, dimethylaminoethyl methacrylate/hexadecyldimethylammoniumethyl methacrylate copolymer, dimethylaminoethyl methacrylate/hexadecyldimethylammoniumethyl methacrylate bromide copolymer, dimethylammoniumethyl methacrylate/cetyldimethylammoniumethyl methacrylate copolymer, dimethylaminoethyl acrylate/acrylate/alkyldimethylammoniumethyl acrylate copolymer, or combinations thereof. A representation of the structure of a dimethylaminoethyl acrylate/acrylate/alkyldimethylammoniumethyl acrylate copolymer is shown by Structure I:

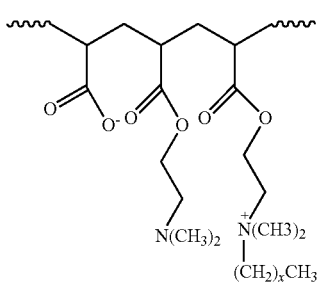

Structure I wherein the atoms in parentheses represent a repeating unit of the formula where the repeating units can occur x times with the value of x ranging from about 6 to about 22, alternatively from about 10 to about 22, or alternatively from about 12 to about 18. The wavy lines in Structure I represent the remainder of the HMRPM polymer molecule. An example of a commercially available water-soluble, hydrophobically modified polymer suitable for use in the present disclosure includes without limitation HPT-1 relative permeability modifier. HPT-1 relative permeability modifier is a hydrophobically modified hydrophilic polymer containing alkyldimethylammoniumethyl methacrylate halide units, and is available from Halliburton Energy Services, Inc.

HMRPM polymers suitable for use in the present disclosure can have molecular weights in the range of from about 10,000 Da to 10,000,000 Daltons, alternatively from about 100,000 Da to about 10,000,000 Da, alternatively from about 10,000 Da to about 1,000,000 Da, or alternatively from about 1,000 Da to about 500,000 Da. In embodiments, the HMRPM comprises poly (alkyldimethylammoniumethyl methacrylate).

In embodiments, the HMRPMs can be further characterized by their precipitate forming tendency in aqueous solutions. Generally, as the pH of a solution increases, e.g., pH values greater than about 7, the HMRPMs tend to precipitate out of the solution at decreasing temperatures, due to a decreased solubility in the aqueous media. For purposes of the disclosure herein, the precipitate forming tendency is an empirical qualitative metric which can be rated on a letter scale from A to F, wherein A indicates no precipitate forming tendency for the HMRPM; F indicates full precipitate forming tendency (e.g., all or most of the HMRPM precipitates out the solution) for the HMRPM; and B, C, D and E indicate increased precipitate forming tendency when compared to the previous letter (e.g., the precipitate forming tendency designated by B is higher than the precipitate forming tendency designated by A, but lower than the precipitate forming tendency designated by C; the precipitate forming tendency designated by C is higher than the precipitate forming tendency designated by B, but lower than the precipitate forming tendency designated by D; the precipitate forming tendency designated by D is higher than the precipitate forming tendency designated by C, but lower than the precipitate forming tendency designated by E; and the precipitate forming tendency designated by E is higher than the precipitate forming tendency designated by D, but lower than the precipitate forming tendency designated by F). The letter scale rating of the precipitate forming tendency and the associated visual descriptions (e.g., definitions) of any formed precipitate are provided in Table 1.

TABLE 1

| Rating | Definition/Visual Description |
|---|---|
| A | clear, no precipitation |
| B | slightly cloudy (transparent) |
| C | cloudy (opaque) |
| D | cloudy (opaque), small (less than about 1 mm) clumps precipitated |
| E | cloudy (opaque), medium (about 1 mm) clumps precipitated |
| F | cloudy (opaque), large (greater than or equal to about 1 mm) clumps precipitated |

The precipitate forming tendency of a HMRPM can be visually assessed as follows: a clear solution has a precipitate forming tendency of A; a slightly cloudy solution has a precipitate forming tendency of B; a cloudy solution has a precipitate forming tendency of B-C; a cloudy solution with small clumps of precipitated solid (e.g., precipitated HMRPM) has a precipitate forming tendency of D; a cloudy solution with medium size clumps of precipitated solid (e.g., precipitated HMRPM) has a precipitate forming tendency of E; and a solution with large clumps of precipitated solid (e.g., precipitated HMRPM) has a precipitate forming tendency of F, as detailed in Table 1. In embodiments, the HMRPMs suitable for use in the present disclosure comprise a precipitate forming tendency of about A, alternatively in the range of from about A to about C, or alternatively from about A to about B.

In embodiments, the WSF further comprises and/or the HMRPM has been pre-reacted with an oxygenated alkylating agent (OAA), for example, as described in U.S. Pat. No. 9,441,151. In such embodiments, the WSF includes the hydrophobically modified relative permeability modifier (HMRPM) and an oxygenated alkylating agent (OAA), collectively referred to herein as HMRPM/OAA or a HMRPM/OAA combination. Utilization of a WSF comprising a HMRPM/OAA in the methods disclosed herein can advantageously facilitate modifying the relative permeability of at least a portion of a wellbore and/or subterranean formation. In embodiments, the WSF comprises a HMRPM polymer (e.g., hydrophobically modified polymer; water-soluble, hydrophobically modified polymer) that has been pre-reacted (e.g., prior to being added to a WSF) with an OAA under conditions to form the HMRPM/OAA combination, which can then be added to the WSF and/or introduced downhole (e.g., with an amount of base fluid to form a pumpable slurry) in desired amounts. For purposes of the disclosure herein the HMRPM/OAA prepared by pre-reacting a HMRPM with an OAA (e.g., prior to contact with one or more additional WSF components) will be referred to as "pre-reacted HMRPM/OAA." In embodiments, pre-reacting a HMRPM with an OAA comprises contacting the HMRPM with the OAA. Accordingly, the HMRPM can comprise a pre-reacted HMRPM/OAA, and/or the HMRPM can be introduced into the wellbore and/or subterranean formation with an OAA (i.e., the components of the WSF, introduced downhole simultaneously and/or separately, can further include an OAA).

In such embodiments, the OAA can be characterized by the general formula R—X, where X is a leaving group and R comprises at least one oxygen atom for every from about 1 to about 5 carbons, with a carbon-to-oxygen ratio of from about 5:1 to about 1:1; alternatively at least one oxygen atom for every from about 2 to about 4 carbons, with a carbon-to-oxygen ratio of from about 4:1 to about 2:1; or alternatively at least one oxygen atom for every from about 2 to about 3 carbons, with a carbon-to-oxygen ratio of from about 3:1 to about 2:1. The OAA can react with any suitable reactive group present in the HMRPM polymer backbone and/or present as a pendant group in the HMRPM. The OAA can react with any primary, secondary or tertiary amine groups; hydroxyls; thiols; thioethers; carboxylates and/or activated methylene carbons adjacent to one or more carbonyl groups present in the HMRPM.

In embodiments, X comprises any leaving group suitable for use in an alkylation reaction of a reactive group. Nonlimiting examples of X leaving groups suitable for use in this disclosure include halide, chloride, bromide, iodide, sulfonate, sulfonate esters, toluenesulfonate (i.e., tosylate), methanesulfonate (i.e., mesylate), carboxylate group, or combinations thereof.

In embodiments, the OAA comprises alcohols; polyethylene oxides; polyethylene glycols, chlorine end-capped methylpolyethylene glycol (MPEG-Cl); polypropylene glycols; amines; epoxides; oxygenated alkyl halides; oxygenated alkyl sulfonates; oxygenated alkyl sulfates; halogenated organic acids, chloroacetic acid; chloroacetate esters, methyl chloroacetate; chloroacetate salts, sodium chloroacetate; carboxylic acid anhydrides, chloroacetic anhydride; esters; imides; amides; acid halides; derivatives thereof; or combinations thereof. An example of a polyethylene glycol based OAA suitable for use in the present disclosure includes without limitation D-4253M, which is a chlorine end-capped methylpolyethylene glycol.

In embodiments, the OAA excludes all alkylating agents that do not comprise at least one oxygen atom. In embodiments, the OAA comprises an alkylating agent that does not comprise at least one oxygen atom in an amount of less than about 20 wt %, 19 wt %, 18 wt %, 17 wt %, 16 wt %, 15 wt %, 14 wt %, 13 wt %, 12 wt %, 11 wt %, 10 wt %, 9 wt %, 8 wt %, 7 wt %, 6 wt %, 5 wt %, 4 wt %, 3 wt %, 2 wt %, or 1 wt %, based on the total weight of the OAA. Nonlimiting examples of alkylating agents that do not comprise at least one oxygen atom include alkyl halides wherein the alkyl portion of the halide is solely hydrocarbon based and comprises no polar atoms (e.g., oxygen); 2-chloro-ethyltrimethylammonium halide; 2-bromo-ethyltrimethylammonium halide, 3-chloro-bromopropyl trimethylammonium halide; 3-bromopropyl trimethylammonium halide; derivatives thereof; and combinations thereof.

In embodiments, the OAA can react with a functional group (e.g., an amine group) of the HMRPM, resulting in an OAA modification (e.g., quaternization of the nitrogen) of such functional group. For example, the OAA can react with an amine group of the HMRPM, resulting in the quaternization of the nitrogen of such amine group. Without being limited by theory, the amine group of the HMRPM and the alkylating agent (e.g., OAA) can engage in a nucleophilic substitution reaction, where the amine group of the HMRPM acts as the nucleophilic agent that attacks the alkylating agent, causing the leaving group to "leave" the alkylating agent. Further, without being limited by theory, the quaternization of amine groups of the HMRPM can lead to an increased solubility of the HMRPM in aqueous media. In some embodiments, the OAA can quaternize from about 1% to about 50% of the amine groups of the HMRPM, alternatively from about 1% to about 25% of the amine groups, or alternatively from about 5% to about 20% of the amine groups.

In some embodiments, the mole ratio of OAA modifications (e.g., OAA quaternization sites) to hydrophobic modifications present in the water-soluble, hydrophobically modified polymer HMRPMs can be in the range of from about 1:1 to about 500:1, alternatively from about 10:1 to about 300:1, or alternatively from about 50:1 to about 250:1.

In embodiments, an OAA can be added directly into a WSF containing HMRPM in an amount sufficient to modify the precipitate forming tendency of the HMRPM. In such embodiments, the OAA modified HMRPM (e.g., HMRPM/OAA) comprises a precipitate forming tendency of less than about C, alternatively less than about B, or alternatively less than about A, at the treatment temperature, when the HMRPM is contacted with an OAA. In embodiments an OAA of the type disclosed herein can be present within the WSF in an amount of from about 0.001 wt % to about 1 wt %, alternatively from about 0.01 wt % to about 0.5 wt %, or alternatively from about 0.05 wt % to about 0.1 wt %, based on the total weight of the WSF.

In embodiments, the HMRPM/OAA can be characterized by a lower critical solution temperature (LCST) greater than or equal to about 140° F., alternatively greater than or equal to about 180° F., or alternatively greater than or equal to about 300° F. Without being limited by theory, the LCST of a polymer (e.g., a HMRPM polymer; a hydrophobically modified polymer; a water-soluble, hydrophobically modified polymer, etc.) can be defined as the temperature above which the polymer phase separates, and forms an insoluble solid phase, such as for example a precipitate or a turbid suspension. For a particular WSF composition, once the temperature of the WSF reaches the LCST or a value above the LCST of the HMRPM polymer (e.g., hydrophobically modified polymer; water-soluble, hydrophobically modified polymer), the HMRPM polymer can precipitate out the solution, which is undesirable, as it can damage the formation and/or lose its effectiveness as a relative permeability modifier. The presence of the HMRPM/OAA combination in the WSF can raise the LCST of the HMRPM polymer when compared to a WSF of similar composition comprising a HMRPM, but no OAA. For example, if the LCST of a WSF comprising a HMRPM and no OAA is y, the LCST of a similar WSF comprising both a HMRPM and an OAA can be about (y+50) ° F., alternatively about (y+150) ° F., or alternatively about (y+250) ° F.

In embodiments, the presence of the OAA in the WSF along with the HMRPM can function to increase the solubility of the HMRPM in the WSF at temperatures above the LCST of HMRPM. Without being limited by theory, the presence of at least one oxygen atom in the structure of the OAA can render the OAA and consequently the HMRPM/OAA more hydrophilic (e.g., water-soluble), when compared with a similar alkylating agent that does not comprise any oxygen atoms, but is rather a hydrocarbon based alkylating agent. Further, in the case of an HMRPM comprising a pendant dialkylamino group, such as for example a pendant dimethylamino group, when the OAA quaternizes an amine group of the HMRPM (e.g., a pendant dialkylamino group such as for example a pendant dimethylamino group), such quaternized amine group has a positive charge on the nitrogen atom, which charge can render the HMRPM more water-soluble at temperatures above the LCST of the untreated HMRPM polymer (e.g., a HMRPM in the absence of an OAA).

In embodiments, the presence of the OAA in the WSF along with the HMRPM can function to delay the precipitation of the HMRPM indefinitely at the formation temperatures. In embodiments, the presence of the OAA in the WSF along with the HMRPM can function to delay the precipitation of the HMRPM by a time period of from greater than or equal to about 1 hour to greater than or equal to about 100 hours, alternatively greater than or equal to about 3 hours, alternatively greater than or equal to about 24 hours, alternatively greater than or equal to about 2 days, at the formation temperatures, when compared to a WSF of similar composition comprising a HMRPM, but no OAA. The extent of the delay can be adjusted by one of ordinary skill in the art with the benefit of this disclosure to meet the needs of the process by adjusting the nature of the OAA used (e.g., OAA type, OAA solubility, amounts, etc.).

In embodiments, the WSF includes an HMRPM that includes a pre-reacted HMRPM/OAA having an LCST greater than or equal to about 150° F., alternatively greater than or equal to about 250° F., or alternatively greater than or equal to about 350° F.

In embodiments, the HMRPM and the OAA can be first pre-reacted with each other to form a pre-reacted HMRPM/OAA, and then the pre-reacted HMRPM/OAA can be added to the other components of the WSF composition (i.e., as the HMRPM of the WSF). In embodiments, the HMRPM and the OAA can be pre-reacted with each other off-site. In alternative embodiments, the HMRPM and the OAA can be pre-reacted with each other at the well site. When manufactured or assembled off site, the pre-reacted HMRPM/OAA combination can be transported to the well site and combined with the other components to form a WSF.

The WSF can include a base fluid. The base fluid can be present in a sufficient amount to form a pumpable WSF. For example, in embodiments, the WSF comprises an aqueous base fluid. Herein, an aqueous base fluid refers to a fluid having less than or equal to about 20 vol. %, 15 vol. %, 10 vol. %, 5 vol. %, 2 vol. %, or 1 vol. % of a non-aqueous fluid based on the total volume of the WSF. In embodiments, the aqueous base fluid has a pH of greater than or equal to about −1, 0, 1, 2, 3, 4, 5, 6, 7, or 8, a pH of less than or equal to about 8, 7, 6, 5, 4, 3, 2, 1, or 0. Aqueous base fluids that can be utilized in the WSF include any aqueous fluid suitable for use in subterranean applications, provided that the aqueous base fluid is compatible with the HMRPM and/or MCSM used in the WSF. For example, the WSF can comprise water or a brine. In embodiments, the base fluid comprises an aqueous brine. In such embodiments, the aqueous brine generally comprises water and an inorganic monovalent salt, an inorganic multivalent salt, or both. The aqueous brine can be naturally occurring or artificially-created. Water present in the brine can be from any suitable source, examples of which include, but are not limited to, sea water, tap water, freshwater, water that is potable or non-potable, untreated water, partially treated water, treated water, produced water, city water, well-water, surface water, or combinations thereof. The salt or salts in the water can be present in an amount ranging from greater than about 0% by weight to a saturated salt solution, alternatively from about 1 wt % to about 18 wt %, or alternatively from about 2 wt % to about 7 wt %, by weight of the aqueous fluid. In embodiments, the salt or salts in the water can be present within the base fluid in an amount sufficient to yield a saturated brine.

Nonlimiting examples of aqueous brines suitable for use in the present disclosure include chloride-based, bromide-based, phosphate-based or formate-based brines containing monovalent and/or polyvalent cations, salts of alkali and alkaline earth metals, or combinations thereof. Additional examples of suitable brines include, but are not limited to: NaCl, KCl, NaBr, $CaCl_2$, $CaBr_2$, $ZnBr_2$, ammonium chloride ($NH_4Cl$), potassium phosphate, sodium formate, potassium formate, cesium formate, ethyl formate, methyl formate, methyl chloro formate, triethyl orthoformate, trimethyl orthoformate, or combinations thereof. In embodiments, the aqueous fluid comprises a brine. The brine can be present in an amount of from about 40 wt % to about 99.8 wt %, alternatively from about 70 wt % to about 99.5 wt %, or alternatively from about 90 wt % to about 99 wt %, based on the total weight of the WSF. Alternatively, the aqueous base fluid can comprise the balance of the WSF after considering the amount of the other components used.

In embodiments, the (e.g., aqueous) base fluid is present in the wellbore servicing fluid in an amount of from about 40 wt % to about 99.8 wt %, alternatively from about 70 wt % to about 99.5 wt %, or alternatively from about 90 wt % to about 99 wt %, based on the total weight of the WSF. When the HMRPM and MCSM are introduced into the WB and/or subterranean formation separately, the base fluid can be combined with the MCSM and/or with the HMRPM prior to introduction downhole. For example, a portion or all of the base fluid can be combined with the MCSM to form a pumpable slurry for introduction downhole, a portion or all of the base fluid can be combined with the HMRPM to form a pumpable slurry for introduction downhole, and/or a portion or all of the base fluid can be introduced downhole separately from the MCSM and/or the HMRPM.

The components of the WSF can further comprise additional components or additives as deemed appropriate for improving the properties of the fluid. Such components or additives can vary depending on the intended use of the fluid in the wellbore. Examples of such additives include, but are not limited to pH adjusting agents, bases, acids, pH buffers, surfactants, emulsifiers, conventional relative permeability modifiers, lime, organic/inorganic viscosifiers, gelling agents, crosslinkers, weighting agents, glass fibers, carbon fibers, suspending agents, clays, clay control agents, fluid loss control additives, dispersants, flocculants, conditioning agents, dispersants, water softeners, acids, foaming agents, proppants, salts, mutual solvents, oxidation and corrosion inhibitors, scale inhibitors, thinners, scavengers, gas scavengers, lubricants, breakers, friction reducers, antifoam agents, bridging agents, and the like, or combinations thereof. These additives can be introduced singularly or in combination using any suitable methodology and in amounts effective to produce the desired improvements in fluid properties.

In embodiments, the WSF further comprises a surfactant and/or demulsifier. Generally, surfactants are amphiphilic molecules that contain a hydrophilic head portion (e.g., polar head group; hydrophilic component) and a hydrophobic tail portion (e.g., non-polar tail group; hydrophobic component; lipophilic component). Typically, the hydrophobic tail portion can be a linear or branched alkyl chain, while the hydrophilic head portion can be a polar functional group (e.g., non-ionic functional group, cationic functional group, anionic functional group). As will be appreciated by one of skill in the art, and with the help of this disclosure, and without being limited by theory, owing to distinct differences in hydrophilicity/hydrophobicity between the hydrophilic head and the hydrophobic tail, surfactants generally reside at interfaces between various phases (e.g., a liquid-solid interface; a liquid-gas interface; a liquid-liquid interface between immiscible liquids; etc.).

Demulsifiers (or emulsion breakers), are a class of chemicals used to separate emulsions, for example, water in oil. In an aspect, the demulsifier prevents and/or breaks an emulsion when it comes in contact with crude oil or breaks an emulsion of the WSF. The demulsifier can include, for example and without limitation, acid catalyzed phenol-formaldehyde resins, base catalyzed phenol-formaldehyde resins, epoxy resins, polyethyleneimines, polyamines, di-epoxides, polyols, dendrimer, silicon particles, silica, alumina, or a combination thereof.

Nonlimiting example of commercially available surfactants (e.g., detergents, emulsions, microemulsions, etc.) suitable for use in the present disclosure include CFS™-485 casing cleaner, LOSURF™-300M surfactant, LOSURF™-357 surfactant, LOSURF™-400 surfactant, LOSURF™-2000S surfactant, LOSURF™-2000M surfactant, LOSURF™-259 nonemulsifier, NEA-96M™ surfactant, BDF™-442 surfactant, and BDF™-443 surfactant. CFS™-485 casing cleaner is a blend of surfactants and alcohols; LOSURF™-300M surfactant is a nonionic surfactant; LOSURF™-357 surfactant is a nonionic liquid surfactant; LOSURF™-400 surfactant is a nonemulsifier; LOSURF™-2000S surfactant is a blend of an anionic nonemulsifier and an anionic hydrotrope; LOSURF™-2000M surfactant is a solid surfactant; LOSURF™-259 nonemulsifier is a non-ionic, nonemulsfier blend; NEA-96M™ surfactant is a general surfactant and nonemulsifier; BDF™-442 surfactant and BDF™-443 surfactant are acid-responsive surfactants; all of which are commercially available from Halliburton Energy Services.

Other nonlimiting example of commercially available surfactants (e.g., detergents, emulsions, microemulsions, etc.) suitable for use in the present disclosure include TERGITOL™ 15-S-9 surfactant, which is commercially available from The Dow Chemical Company; TERGITOL™ 15-S-7 surfactant, which is commercially available from The Dow Chemical Company; AMADOL® 511 non-ionic alkanolamide water-based mud additive, which is commercially available from Akzo Nobel Surface Chemistry; STEPANOL® WAT-K anionic surfactant, which is commercially available from Stepan; BASAROL® demulsifiers, which are commercially available from BASF; EXXAL™ alcohols, which are commercially available from ExxonMobil; CLEARBREAK® demulsifiers, which are commercially available from Solvay; UNIDYNE™ TG-5543 weak cationic water emulsion, which is commercially available from Daikin; and the like; or combinations thereof.

In some embodiments, the additional component(s) can be present in the WSF in an amount of from about 0.01 wt % to about 10 wt %, alternatively from about 0.01 wt % to about 5 wt %, alternatively from about 0.01 wt % to about 3 wt %, alternatively from about 0.05 wt % to about 2.5 wt %, alternatively from about 0.1 wt % to about 2 wt %, alternatively from about 0.5 wt % to about 1.5 wt %, alternatively from about 0.05 wt % to about 10 wt %, alternatively from about 0.1 wt % to about 7.5 wt %, or alternatively from about 1 wt % to about 5 wt %, based on the total weight of the WSF.

In embodiments, the WSF comprises a pH adjusting agent. In some embodiments, the pH adjusting agent is a base. In other embodiments, the pH adjusting agent is an acid. In some other embodiments, the pH adjusting agent is a pH buffer.

In embodiments, a base can be used for increasing the pH of a solution by about 0.1 pH units, alternatively, about 0.2 pH units, alternatively, about 0.5 pH units, alternatively, about 1.0 pH units, alternatively, about 1.5 pH units, alternatively, about 2.0 pH units, alternatively, about 2.5 pH units, alternatively, about 3.0 pH units, alternatively, about 4.0 pH units, alternatively, about 5.0 pH units, alternatively, about 6.0 pH units, or alternatively, about 7.0 or more pH units.

Nonlimiting examples of bases suitable for use in the present disclosure include ammonium and alkali metal carbonates and bicarbonates, $Na_2CO_3$, $K_2CO_3$, $CaCO_3$, $MgCO_3$, $NaHCO_3$, $KHCO_3$, alkali and alkaline earth metal oxides, BaO, SrO, $Li_2O$, CaO, $Na_2O$, $K_2O$, MgO, alkali and alkaline earth metal hydroxides, NaOH, $NH_4OH$, KOH, LiOH, $Mg(OH)_2$, alkali and alkaline earth metal phosphates, $Na_3PO_4$, $Ca_3(PO_4)_2$, and the like, or combinations thereof. In embodiments, the base can be included within the WSF in a suitable amount that will provide the desired pH.

In embodiments, an acid can be used for decreasing the pH of a solution by about 0.1 pH units, alternatively, about 0.2 pH units, alternatively, about 0.5 pH units, alternatively, about 1.0 pH units, alternatively, about 1.5 pH units, alternatively, about 2.0 pH units, alternatively, about 2.5 pH units, alternatively, about 3.0 pH units, alternatively, about 4.0 pH units, alternatively, about 5.0 pH units, alternatively, about 6.0 pH units, or alternatively, about 7.0 or more pH units.

Nonlimiting examples of acids suitable for use in the present disclosure include mineral acids, hydrochloric acid, sulphuric acid, sulphonic acid, sulphamic acid; organic acids, formic acid, acetic acid, monochloroacetic acid, dichloroacetic acid, trichloroacetic acid, sulphinic acid, methanesulfonic acid, lactic acid, glycolic acid, oxalic acid, propionic acid, butyric acid; ammonium salts, and salts of weak bases, such as for example organic amines; or combinations thereof. In embodiments, the acid can be included within the WSF in a suitable amount that will provide the desired pH.

In embodiments, the pH adjusting agent is a pH buffer. The pH buffer comprises a combination of weak acids or weak bases, in combination with the corresponding salts to maintain the pH of a fluid in a desired range. Nonlimiting examples of chemical combinations which can be used as pH buffers include acetic acid/sodium acetate; sodium carbonate/sodium bicarbonate; and sodium dihydrogen phosphate/sodium monohydrogen phosphate.

In embodiments, the WSF is an aqueous based fracturing fluid with a pH of greater than or equal to about 2 comprising an HMRPM, a MCSM, proppant, surfactants, and an aqueous base fluid. In embodiments, the WSF is an aqueous based gravel packing fluid with a pH of greater than or equal to about 2 comprising an HMRPM, a MCSM, gravel, surfactants, and an aqueous base fluid.

In embodiments, the wellbore service being performed is a fracturing operation, wherein a WSF is placed (e.g., pumped downhole) in the formation. In such embodiments, the WSF can be a fracturing fluid with a pH of greater than or equal to about 2. As will be understood by one of ordinary skill in the art, the particular composition of a fracturing fluid will be dependent on the type of formation that is to be fractured. Fracturing fluids typically comprise an aqueous fluid (e.g., water), a proppant, a surfactant, acid, friction reducers, gelling agents, scale inhibitors, pH-adjusting agents, oxygen scavengers, breakers, crosslinkers, iron-control agents, corrosion inhibitors, bactericides, and the like.

In embodiments, the fracturing fluid comprises a proppant. In embodiments, the proppant can comprise any suitable particulate material, which can be used to prop fractures open, i.e., a propping agent or a proppant. As used herein, a proppant refers to a particulate material that is suitable for use in a proppant pack or a gravel pack. When deposited in a fracture, the proppant can form a proppant pack, resulting in conductive channels through which fluids can flow to the wellbore. The proppant functions to prevent the fractures from closing due to overburden pressures.

Nonlimiting examples of proppants suitable for use in this disclosure include silica (sand), graded sand, Ottawa sands, Brady sands, Colorado sands; resin-coated sands; gravels; synthetic organic particles, nylon pellets, high density plastics, teflons, rubbers, resins; ceramics, aluminosilicates; glass; sintered bauxite; quartz; aluminum pellets; ground or crushed shells of nuts, walnuts, pecans, almonds, ivory nuts, brazil nuts, and the like; ground or crushed seed shells (including fruit pits) of seeds of fruits, plums, peaches, cherries, apricots, and the like; ground or crushed seed shells of other plants (e.g., maize, corn cobs or corn kernels); crushed fruit pits or processed wood materials, materials derived from woods, oak, hickory, walnut, poplar, mahogany, and the like, including such woods that have been processed by grinding, chipping, or other form of particleization; or combinations thereof. In embodiments, the proppant comprises sand.

The proppants can be of any suitable size and/or shape. In embodiments, a proppant suitable for use in the present disclosure can have an average particle size in the range of from about 2 to about 400 mesh, alternatively from about 8 to about 100 mesh, or alternatively from about 10 to about 70 mesh, U.S. Sieve Series.

In embodiments, a proppant can be present in the WSF in an amount of from about 0.1 pounds per gallon (ppg) to about 28 ppg, alternatively from about 0.1 ppg to about 14 ppg, or alternatively from about 0.1 ppg to about 8 ppg, based on the volume of the fracturing or gravel-packing fluid.

In embodiments, the wellbore service being performed is a gravel packing operation, wherein a WSF is placed (e.g., pumped downhole) in the formation. In such embodiments, the WSF is a gravel packing fluid. A "gravel pack" is a term commonly used to refer to a volume of particulate materials (such as gravel and/or sand) placed into a wellbore to at least partially reduce the migration of unconsolidated formation particulates into the wellbore. Gravel packing operations commonly involve placing a gravel pack screen in the wellbore neighboring a desired portion of the subterranean formation, and packing the surrounding annulus between the screen and the subterranean formation with particulate materials that are sized to prevent and inhibit the passage of formation solids through the gravel pack with produced fluids. In some instances, a screenless gravel packing operation can be performed. In embodiments, the gravel pack comprises a proppant material of the type previously described herein. Gravel packing is described, for example, in more detail in U.S. Pat. No. 8,183,186.

In embodiments, the disclosed WSF and methods of using the same disclosed herein can be advantageously employed in the performance of one or more wellbore servicing operations.

In embodiments, the WSF comprising components including an HMRPM (e.g., one or more HMRPMs as described hereinabove) and a MCSM (e.g., one or more MCSMs as described hereinabove) can be advantageously used for modifying the permeability of at least a portion of any suitable type of subterranean formation. Nonlimiting examples of formations suitable for this disclosure include sandstone, carbonate-containing formations, shale, mudstone, limestone, chalk, or combinations thereof.

The WSF can be utilized over a wide range of bottom hole temperatures (BHTs). For example and without limitation, in embodiments, the WSF of this disclosure (e.g., components of the WSF) can be advantageously used at BHTs in the range of from about 140° F. to about 350° F., alternatively from about 175° F. to about 350° F., or from about 200° F. to about 300° F.

In embodiments, the MCSMs of the type described herein have the advantages of being highly water-soluble and readily commercially available.

In embodiments, the WSF of the type described herein (e.g., the components of the WSF) can be advantageously used in a variety of applications, such as for example and without limitation produced water control, diversion of aqueous fluids, fluid loss control, profile control in injection well for EOR applications, water swelling inhibition of clays and shale, etc. Additional advantages of the WSF system and/or the methods of using the same can be apparent to one of skill in the art viewing this disclosure.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Screening tests were conducted in a fluid loss cell at 190° F., using 50 micron calcium carbonate as the filter bed. For this Example 1, treating solutions including the HMRPM HPT-1 (available from Halliburton Energy Services, Inc.) without (Run 1) and with a MCSM (INJECTROL® A in Run 2, zinc acetate in Run 3, or FDP-1355 in Run 4) were investigated. An amount of 100 mL of a treating solution, comprising the HMRPM HPT-1 or the HMRPM HPT-1 and a MCSM, was added to the cell, 30 psi nitrogen pressure was applied and leak off was collected for 10 minutes. This test can be utilized as a quality control (QC) test for HPT-1 (e.g., utilizing sand instead of calcium carbonate). For the QC test, the passing criterion is less than 100 mL of leak off in 10 minutes. For this example, an additional step was added for formulations which provided less than 100 mL of leak off. In those cases, at the end of the 10 minute time period, the remaining polymer solution was removed from the cell and replaced with a calcium chloride brine. The cell was then shut in overnight, at 190° F. The following day, 30 psi of pressure was applied and leak off collected over 10 minutes. Again, an amount of less than 100 mL in 10 minutes was considered a positive result, indicating the ability of the treatment to maintain low brine permeability.

The results of this Example 1 are shown below in Table 2. In these tests, the HPT-1 concentration was held constant at 100 gal/Mgal. Column 1 shows the mix water, Column 2 shows the volume of polymer solution leak off, and column 3 shows the volume of brine leak off after the overnight shut in.

TABLE 2

Fluid Loss Results from Example 1
(100 gal/Mgal HPT-1)

| Mix Water | Initial Polymer Leak Off, mL | Overnight Brine Leak Off, mL |
|---|---|---|
| 2% Calcium Chloride | 17 | 100 @ 4:00 |
| (Control) 0.2% INJECTROL® A | 26 | 80 |
| 3% Sodium Phosphate | 60 | 68 |
| 0.5% Zinc Acetate | 20 | 56 |

As seen in Table 2, the solution containing only HPT-1 in 2% $CaCl_2$ (control test) provided less than 100 mL of leak off in 10 minutes. However, after the overnight shut in, 100 mL of brine leak off was obtained in only 4 minutes, indicating that the HMRPM HPT-1 alone does not provide lasting permeability reduction. The inventive tests, with various MCSMs added to the HPT-1 solution, provided less than 100 mL of leak off in 10 minutes, showing an improvement in the permeability reduction. The sodium phosphate MCSM provided an overnight brine leak off of 68 mL, and the zinc acetate MCSM provided an overnight brine leak off of 56 mL, while INJECTROL® A provided an overnight brine leak off of 80 mL.

Example 2

In this Example 2, core and carbonate pack tests at 190° F. were studied, comparing pre-treatment and post-treatment permeabilities for brine and oil. Results are shown below in Table 3 hereinbelow. The HMRPM (i.e., HPT-1) concentrations were selected via producer recommendations based on permeability and temperature. Column 1 indicates whether tests were run in carbonate cores or packs of calcium carbonate (BARACARB® 150, available from Halliburton Energy Services, Houston, Tex.).

TABLE 3

Results from Example 2
Core/Pack Flow Tests 190° F.

| Run # | Core or Pack | Mix Water | Initial Brine Permeability | Final Brine Permeability | % Brine Permeability Reduction | Initial Oil Permeability | Final Oil Permeability | % Oil Permeability Reduction |
|---|---|---|---|---|---|---|---|---|
| 1 | Core | 2% Calcium Chloride | 63 | 63 | 0 | — | — | — |
| 2 | Core | 0.2% INJECTROL® A | 110 | 5 | 95 | 28 | 15 | 46 |
| 3 | Core | 0.5% Zinc Acetate | 168 | 7 | 96 | — | — | — |
| 4 | Core | 0.35% FDP-1355 | 80 | 47 | 41 | — | — | — |
| 5 | Pack | 2% Calcium Chloride | 2230 | 2045 | 8 | — | — | — |
| 6 | Pack | 0.2% INJECTROL® A | 1990 | 426 | 78 | 868 | 763 | 12 |
| 7 | Pack | 0.5% Zinc Acetate | 1200 | 6 | 99 | 1000 | 800 | 20 |

Run 1 in Table 3 was a control run that employed the HMRPM HPT-1 mixed in 2% $CaCl_2$), with no MCSM. The core test of Run 1 shows no reduction in brine permeability. It should also be noted that after the treatment the brine permeability returned to its original level (0% reduction) after flowing only 5 pore volumes of brine, illustrating that the HMRPM HPT-1 rapidly lost its effectiveness to reduce brine permeability in carbonate cores. However, the core tests of Run 2, Run 3, and Run 4 illustrate that adding the MCSM to the HPT-1 formulation provides longer term brine permeability reduction. For the INJECTROL® A test of Run 2, 1051 pore volumes of brine were flowed after the treatment; for the zinc acetate of Run 3, 115 pore volumes were flowed after the treatment; and for the FDP-1355 of Run 4, 3200 pore volumes were flowed after the treatment. The INJECTROL® A formulation showed a 46% reduction in oil permeability, but this is substantially less than the level of brine permeability reduction.

The pack tests of Run 5, Run 6, and Run 7, employing the BARACARB® 150, show similar results. The control Run 5 utilizing the HMRPM (i.e., HPT-1) in 2% $CaCl_2$) showed only an 8% reduction in brine permeability. Inventive Run 6 and Run 7 employing the MCSM additives INJECTROL® A and zinc acetate, respectively, showed significantly higher levels of brine permeability reduction (78% and 99%, respectively), with much lower levels of reduction in oil permeability (12% and 20%, respectively).

ADDITIONAL DISCLOSURE

The following are non-limiting, specific embodiments in accordance with the present disclosure:

In a first embodiment, a method of servicing a wellbore in a subterranean formation comprises: placing components of a wellbore servicing fluid in the wellbore and/or subterranean formation, wherein the components comprise a hydrophobically modified relative permeability modifier, a metal carbonate surface modifier, and an aqueous base fluid; and allowing the wellbore servicing fluid to modify the permeability of at least a portion of the wellbore and/or subterranean formation.

A second embodiment can include the method of the first embodiment, wherein the hydrophobically modified relative permeability modifier comprises a water soluble, hydrophobically modified polymer (e.g., wherein the hydrophobically modified polymer has a solubility in water in a range of from about 0.01, 0.1, 0.2, 0.3, 0.4, or 0.5 wt % to about 5, 10, or 20 wt % solubility in distilled water at room temperature, or greater than or equal to about 0.01, 0.1, 0.2, 0.3, 0.4, 0.5, 1, 2, 3, 4, 5, 6, 7, 8, 9, or 10 wt % solubility in distilled water at room temperature).

A third embodiment can include the method of the first or second embodiments, wherein the water-soluble, hydrophobically modified polymer comprises hydrophobically modified poly(dimethylaminoethyl methacrylate), hydrophobically modified poly(dimethylaminopropyl methacrylamide), poly(alkyldimethylammoniumethyl methacrylate), poly(octadecyldimethylammoniumethyl methacrylate), poly(hexadecyldimethylammoniumethyl methacrylate), poly(octadecyldimethylammoniumethyl methacrylamide), poly(hexadecyldimethylammoniumpropyl methacrylamide), acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, acrylamide/2-acrylamido-2-methyl propane sulfonic acid/2-ethylhexyl methacrylate terpolymer, aminomethacrylate/alkyl amino methacrylate copolymer, dimethylaminoethyl methacrylate/alkyl-dimethylammoniumethyl methacrylate copolymer, dimethylaminoethyl methacrylate/hexadecyldimethylammoniumethyl methacrylate copolymer, dimethylaminoethyl methacrylate/hexadecyldimethyl-ammoniumethyl methacrylate bromide copolymer, dimethylammoniumethyl methacrylate/cetyldimethylammoniumethyl methacrylate copolymer, dimethyl-aminoethyl acrylate/acrylate/alkyl-dimethylammonium-ethyl acrylate copolymer, a compound characterized by Structure I:

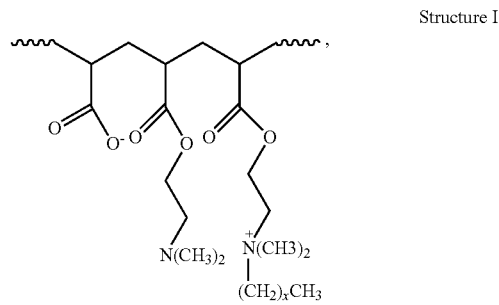

Structure I or combinations thereof.

A fourth embodiment can include the method of any one of the first to third embodiments, wherein the hydrophobically modified relative permeability modifier comprises a polyelectrolyte.

A fifth embodiment can include the method of any one of the first to fourth embodiments, wherein the metal carbonate surface modifier is water soluble (e.g., has a solubility in water in a range of from about 0.01, 0.1, 0.2, 0.3, 0.4, or 0.5 wt % to about 5, 10, or 20 wt %, or greater than or equal to about 0.01, 0.1, 0.2, 0.3, 0.4, 0.5, 1, 2, 3, 4, 5, 6, 7, 8, 9, or 10 wt % solubility in distilled water at room temperature).

A sixth embodiment can include the method of any one of the first to fifth embodiments, wherein the metal carbonate surface modifier comprises a phosphate, a carboxylate, an acetate, a silicate, a phosphonate carboxylate, or a combination thereof.

A seventh embodiment can include the method of any one of the first to sixth embodiments, wherein the metal carbonate surface modifier comprises sodium phosphate, zinc acetate, sodium silicate (e.g., INJECTROL® A), phosphonate having a partially or fully neutralized aminodiacetic acid group (e.g., FDP 1355), or a combination thereof.

An eighth embodiment can include the method of any one of the first to seventh embodiments, wherein the hydrophobically modified relative permeability modifier is present in the wellbore servicing fluid in an amount of from about 0.01 wt % to about 10 wt %, alternatively from about 0.1 wt % to about 3 wt %, or alternatively from about 0.5 wt % to about 1 wt %; the metal carbonate surface modifier is present in the wellbore servicing fluid in an amount of from about from about 0.001 wt % to about 1 wt %, alternatively from about 0.01 wt % to about 0.5 wt %, or alternatively from about 0.05 wt % to about 0.1 wt %; and the aqueous base fluid is present in the wellbore servicing fluid in an amount of from about 40 wt % to about 99.8 wt %, alternatively from about 70 wt % to about 99.5 wt %, or alternatively from about 89 wt % to about 99 wt %, based on the total weight of the wellbore servicing fluid.

A ninth embodiment can include the method of any one of the first to eighth embodiments, wherein the aqueous base fluid comprises a brine.

A tenth embodiment can include the method of any one of the first to ninth embodiments, wherein the wellbore servicing fluid reduces a permeability to water of the at least the portion of the wellbore and/or subterranean formation by at least 5, 10, 20, 30, 40, 50, 60, 70, 80, or 90%.

An eleventh embodiment can include the method of any one of the first to tenth embodiments, wherein the wellbore servicing fluid reduces an oil permeability of the at least the portion of the wellbore and/or subterranean formation by less than or equal to about 0, 1, 2, 3, 4, 5, 6, 7, 8, 9, 10, 20, 30, 40, or 50%.

A twelfth embodiment can include the method of any one of the first to eleventh embodiments, wherein the subterranean formation comprises a metal carbonate.

A thirteenth embodiment can include the method of the twelfth embodiment, wherein the metal carbonate comprises calcium carbonate, iron carbonate, magnesium calcium carbonate, strontium carbonate, calcite, dolomite, mixed carbonate/silicate, layered carbonate/silicate, or a combination thereof.

A fourteenth embodiment can include the method of any one of the first to thirteenth embodiments, wherein the wellbore servicing fluid further comprises a non-emulsifier.

A fifteenth embodiment can include the method of the fourteenth embodiment, wherein the non-emulsifier is selected from acid catalyzed phenol-formaldehyde resins, base catalyzed phenol-formaldehyde resins, epoxy resins, polyethyleneimines, polyamines, di-epoxides, polyols, dendrimer, silicon particles, silica, alumina, or any combination thereof.

A sixteenth embodiment can include the method of any one of the first to fifteenth embodiments, wherein placing the components of the wellbore servicing fluid in the wellbore and/or subterranean formation comprises introducing the metal carbonate surface modifier into the wellbore and/or subterranean formation prior to and/or simultaneously with introducing the hydrophobically modified relative permeability modifier into the wellbore and/or subterranean formation.

A seventeenth embodiment can include the method of the sixteenth embodiment, wherein placing the components of the wellbore servicing fluid in the wellbore and/or subterranean formation comprises introducing at least a portion of the metal carbonate surface modifier into the wellbore and/or subterranean formation simultaneously with the hydrophobically modified relative permeability modifier, by combining the aqueous base fluid, the hydrophobically modified relative permeability modifier, and the at least the portion of the metal carbonate surface modifier to form a solution of the wellbore servicing fluid, and introducing the solution into the wellbore and/or subterranean formation.

An eighteenth embodiment can include the method of any one of the first to seventeenth embodiments, wherein the solution has a pH of greater than or equal to about −1, 0, 1, or 2, or less than or equal to about 3, 2, 1, or 0.

A nineteenth embodiment can include the method of the sixteenth embodiment, wherein placing the components of the wellbore servicing fluid in the wellbore and/or subterranean formation comprises introducing at least a portion of the metal carbonate surface modifier into the wellbore and/or subterranean formation prior to introducing the hydrophobically modified relative permeability modifier into the wellbore and/or subterranean formation.

A twentieth embodiment can include the method of any one of the first to nineteenth embodiments, wherein the wellbore servicing fluid is a fracturing fluid, a gravel packing fluid, a stimulation fluid, an acidizing fluid, a conformance control fluid, a clay control fluid, a scale control fluid, an enhanced oil recovery fluid, a surfactant flooding fluid, an energized fluid, a secondary recovery fluid, an injection fluid, or a combination thereof.

A twenty first embodiment can include the method of any one of the first to twentieth embodiments further comprising combining the hydrophobically modified relative permeability modifier, the metal carbonate surface modifier, and the aqueous base fluid to form the wellbore servicing fluid, and introducing the wellbore servicing fluid into the wellbore and/or subterranean formation.

In a twenty second embodiment, a method of servicing a wellbore in a subterranean formation comprises: placing components of a wellbore servicing fluid in the wellbore and/or subterranean formation, wherein the components comprise a hydrophobically modified relative permeability modifier, a metal carbonate (e.g., calcium carbonate) surface modifier, and an aqueous base fluid; wherein the hydrophobically modified relative permeability modifier comprises poly (alkyldimethylammoniumethyl methacrylate), and wherein the formation comprises a metal carbonate; and allowing the wellbore servicing fluid to modify the permeability of at least a portion of the wellbore and/or subterranean formation.

In a twenty third embodiment, a method of servicing a wellbore in a subterranean formation comprises: introducing components of a wellbore servicing fluid into the subterranean formation via the wellbore, wherein the subterranean formation comprises a metal carbonate, and wherein the wellbore servicing fluid comprises: an aqueous base fluid, a hydrophobically modified relative permeability modifier, and a calcium surface modifier; and allowing the wellbore servicing fluid to modify the permeability of at least a portion of the wellbore and/or subterranean formation via interaction of the metal carbonate surface modifier with the wellbore and/or subterranean formation and the hydrophobically modified relative permeability modifier.

A twenty fourth embodiment can include the method of the twenty third embodiment, wherein the hydrophobically modified relative permeability modifier comprises a water soluble, hydrophobically modified polymer (e.g., wherein the hydrophobically modified polymer has a solubility in water in a range of from about 0.01 wt % to about 10 wt %, from about 0.1 wt % to about 10 wt %, from about 0.1 wt % to about 10 wt %, or greater than or equal to about 0.01 wt %, 0.1 wt %, or 1 wt % solubility in distilled water at room temperature).

A twenty fifth embodiment can include the method of the twenty third or twenty fourth embodiments, wherein the water-soluble hydrophobically modified polymer comprises hydrophobically modified poly(dimethylaminoethyl methacrylate), hydrophobically modified poly(dimethylaminopropyl methacrylamide), poly(alkyldimethylammoniumethyl methacrylate), poly (octadecyldimethylammoniumethyl methacrylate), poly (hexadecyldimethylammoniumethyl methacrylate), poly (octadecyldimethylammoniumethyl methacrylamide), poly (hexadecyldimethylammoniumpropyl methacrylamide), acrylamide/octadecyldimethylammommethyl methacrylate bromide copolymer, dimethylaminoethyl methacrylate/vinyl pyrrolidone/hexadecyldimethylammoniumethyl methacrylate bromide terpolymer, acrylamide/2-acrylamido-2-methyl propane sulfonic acid/2-ethylhexyl methacrylate terpolymer, amino methacrylate/alkyl amino methacrylate copolymer, dimethylaminoethyl methacrylate/alkyldimethylammoniumethyl methacrylate copolymer, dimethylaminoethyl methacrylate/hexadecyldimethylammoniumethyl methacrylate copolymer, dimethylaminoethyl methacrylatelhexadecyldimethyl ammoniumethyl methacrylate bromide copolymer, dimethylammoniumethyl methacrylate/cetyldimethylammomumethyl methacrylate copolymer, dimethylaminoethyl acrylate/acrylate/alkyldimethylmoniumethyl acrylate copolymer, a compound characterized by Structure I:

Structure I

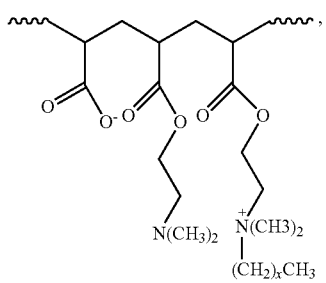

or combinations thereof.

A twenty sixth embodiment can include the method of any one of the twenty third to twenty fifth embodiments, wherein the hydrophobically modified relative permeability modifier comprises a polyelectrolyte.

A twenty seventh embodiment can include the method of any one of the twenty third to twenty sixth embodiments, wherein the hydrophobically modified relative permeability modifier is present in the wellbore servicing fluid in an amount of from about 0.01 wt % to about 10 wt %, alternatively from about 0.1 wt % to about 3 wt %, or alternatively from about 0.5 wt % to about 1 wt %; the metal carbonate surface modifier is present in the wellbore servicing fluid in an amount of from about from about 0.001 wt % to about 1 wt %, alternatively from about 0.01 wt % to about 0.5 wt %, or alternatively from about 0.05 wt % to about 0.1 wt %; and the aqueous base fluid is present in the wellbore servicing fluid in an amount of from about 40 wt % to about 99.8 wt %, alternatively from about 70 wt % to about 99.5 wt %, or alternatively from about 90 wt % to about 99 wt %, based on the total weight of the wellbore servicing fluid.

A twenty eighth embodiment can include the method of any one of the twenty third to twenty seventh embodiments, wherein the aqueous base fluid comprises a brine.

A twenty ninth embodiment can include the method of any one of the twenty third to twenty eighth embodiments, wherein the wellbore servicing fluid reduces a permeability to water of the at least the portion of the wellbore and/or subterranean formation by at least 5, 10, 20, 30, 40, 50, 60, 70, 80, or 90%.

A thirtieth embodiment can include the method of the twenty ninth embodiment, wherein the wellbore servicing fluid reduces an oil permeability of the at least the portion of the wellbore and/or subterranean formation by less than or equal to about 0, 1, 2, 3, 4, 5, 6, 7, 8, 9, 10, 20, 30, 40, or 50%.

A thirty first embodiment can include the method of any one of the twenty third to thirtieth embodiments, wherein the subterranean formation comprises a metal carbonate.

A thirty second embodiment can include the method of the thirty first embodiment, wherein the metal carbonate comprises calcium carbonate, iron carbonate, magnesium calcium carbonate, strontium carbonate, calcite, dolomite, mixed carbonate/silicate, layered carbonate/silicate, or a combination thereof.

A thirty third embodiment can include the method of any one of the twenty third to thirty second embodiments, wherein the wellbore servicing fluid further comprises a non-emulsifier.

A thirty fourth embodiment can include the method of the thirty third embodiment, wherein the non-emulsifier is selected from acid catalyzed phenol-formaldehyde resins, base catalyzed phenol-formaldehyde resins, epoxy resins, polyethyleneimines, polyamines, di-epoxides, polyols, dendrimer, silicon particles, silica, alumina, or any combination thereof.

A thirty fifth embodiment can include the method of any one of the twenty third to thirty fourth embodiments, wherein placing the components of the wellbore servicing fluid in the wellbore and/or subterranean formation comprises introducing the metal carbonate surface modifier into the wellbore and/or subterranean formation prior to and/or simultaneously with introducing the hydrophobically modified relative permeability modifier into the wellbore and/or subterranean formation.

A thirty sixth embodiment can include the method of the thirty fifth embodiment, wherein placing the components of the wellbore servicing fluid in the wellbore and/or subterranean formation comprises introducing at least a portion of the metal carbonate surface modifier into the wellbore and/or subterranean formation simultaneously with the hydrophobically modified relative permeability modifier, by combining the aqueous base fluid, the hydrophobically modified relative permeability modifier, and the at least the portion of the metal carbonate surface modifier to form a solution of the wellbore servicing fluid, and introducing the solution into the wellbore and/or subterranean formation.

A thirty seventh embodiment can include the method of any one of the twenty third to thirty sixth embodiments, wherein the solution has a pH of greater than or equal to about −1, 0, 1, or 2, or less than or equal to about 3, 2, 1, or 0.

A thirty eighth embodiment can include the method of any one of the thirty fifth to thirty seventh embodiments, wherein placing the components of the wellbore servicing fluid in the wellbore and/or subterranean formation comprises introducing at least a portion of the metal carbonate surface modifier into the wellbore and/or subterranean formation prior to introducing the hydrophobically modified relative permeability modifier into the wellbore and/or subterranean formation.

A thirty ninth embodiment can include the method of any one of the twenty third to thirty eighth embodiments, wherein the wellbore servicing fluid is a fracturing fluid, a gravel packing fluid, a stimulation fluid, an acidizing fluid, a conformance control fluid, a clay control fluid, a scale control fluid, an enhanced oil recovery fluid, a surfactant flooding fluid, an energized fluid, a secondary recovery fluid, an injection fluid, or a combination thereof.

A fortieth embodiment can include the method of any one of the twenty third to thirty ninth embodiments further comprising combining (at least a portion of) the hydrophobically modified relative permeability modifier, the metal carbonate surface modifier, and the aqueous base fluid to form (at least a portion of) the wellbore servicing fluid, and introducing (the at least a portion of) the wellbore servicing fluid into the wellbore and/or subterranean formation.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore in a subterranean formation comprising:
   modifying a permeability of at least a portion of the wellbore and/or subterranean formation by placing components of a wellbore servicing fluid in the wellbore and/or subterranean formation, wherein the components comprise a hydrophobically modified relative permeability modifier, a metal carbonate surface modifier selected from the group consisting of zinc acetate, silicates, phosphonate carboxylates and combinations thereof, and an aqueous base fluid, wherein the hydrophobically modified relative permeability modifier is present in the wellbore servicing fluid in an amount of from about 0.01 weight percent (wt %) to about 10 wt %; the metal carbonate surface modifier is present in the wellbore servicing fluid in an amount of from about 0.001 wt % to about 1 wt %; and the aqueous base fluid is present in the wellbore servicing fluid in an amount of from about 40 wt % to about 99.8 wt %, based on the total weight of the wellbore servicing fluid; and allowing the wellbore servicing fluid to modify the permeability of at least a portion of the wellbore and/or subterranean formation.

2. The method of claim 1, wherein the hydrophobically modified relative permeability modifier comprises a hydrophobically modified polymer selected from the group consisting of hydrophobically modified poly(dimethylaminoethyl methacrylate), hydrophobically modified poly (dimethylaminopropyl methacrylamide), poly (alkyldimethylammoniumethyl methacrylate), poly (octadecyldimethylammoniumethyl methacrylate), poly (hexadecyldimethylammoniumethyl methacrylate), poly (octadecyldimethylammoniumethyl methacrylamide), poly (hexadecyldimethylammoniumpropyl methacrylamide), acrylamide/octadecyldimethylammoniumethyl methacrylate bromide copolymer, dimethylaminoethyl methacrylate/ vinyl pyrrolidone/hexadecyldimethylammoniumethyl methacrylate bromide terpolymer, acrylamide/2-acrylamido-2-methyl propane sulfonic acid/2-ethylhexyl methacrylate terpolymer, aminomethacrylate/alkyl amino methacrylate copolymer, dimethylaminoethyl methacrylate/alkyl-dimethylammoniumethyl methacrylate copolymer, dimethylaminoethyl methacrylate/hexadecyldimethylammoniumethyl methacrylate copolymer, dimethylaminoethyl methacrylate/ hexadecyldimethyl-ammoniumethyl methacrylate bromide copolymer, dimethylammoniumethyl methacrylate/cetyldimethylammoniumethyl methacrylate copolymer, dimethylaminoethyl acrylate/acrylate/alkyl-dimethylammoniumethyl acrylate copolymer, and compounds characterized by Structure I:

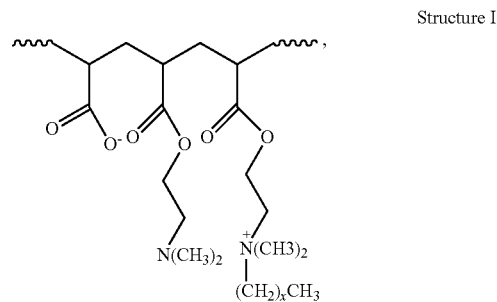

Structure I wherein x is in a range of from about 6 to about 22, or a combination thereof.

3. The method of claim 1, wherein the metal carbonate surface modifier is selected from the group consisting of phosphonate carboxylates, silicates, and combinations thereof.

4. The method of claim 1, wherein the metal carbonate surface modifier is selected from the group consisting of sodium silicate, phosphonates having a partially or fully neutralized aminodiacetic acid group, and combinations thereof.

5. The method of claim 1, wherein the aqueous base fluid comprises a brine.

6. The method of claim 1, wherein the wellbore servicing fluid reduces a permeability to water of the at least the portion of the wellbore and/or subterranean formation more than the wellbore servicing fluid reduces a permeability to oil of the at least the portion of the wellbore and/or subterranean formation.

7. The method of claim 1, wherein the subterranean formation comprises a metal carbonate.

8. The method of claim 7, wherein the metal carbonate is selected from the group consisting of calcium carbonate, iron carbonate, magnesium calcium carbonate, strontium carbonate, calcite, dolomite, mixed carbonate/silicate, layered carbonate/silicate, and combinations thereof.

9. The method of claim 1, wherein placing the components of the wellbore servicing fluid in the wellbore and/or subterranean formation comprises introducing the metal carbonate surface modifier into the wellbore and/or subterranean formation prior to and/or simultaneously with introducing the hydrophobically modified relative permeability modifier into the wellbore and/or subterranean formation.

10. The method of claim 9, wherein placing the components of the wellbore servicing fluid in the wellbore and/or subterranean formation comprises introducing at least a portion of the metal carbonate surface modifier into the wellbore and/or subterranean formation simultaneously with the hydrophobically modified relative permeability modifier, by combining the aqueous base fluid, the hydrophobically modified relative permeability modifier, and the at least the portion of the metal carbonate surface modifier to form a solution of the wellbore servicing fluid, and introducing the solution into the wellbore and/or subterranean formation.

11. The method of claim 9, wherein placing the components of the wellbore servicing fluid in the wellbore and/or subterranean formation comprises introducing at least a portion of the metal carbonate surface modifier into the wellbore and/or subterranean formation prior to introducing the hydrophobically modified relative permeability modifier into the wellbore and/or subterranean formation.

12. The method of claim 1, wherein the wellbore servicing fluid is a fracturing fluid, a gravel packing fluid, a stimulation fluid, an acidizing fluid, a conformance control fluid, a clay control fluid, a scale control fluid, an enhanced oil recovery fluid, a surfactant flooding fluid, an energized fluid, a secondary recovery fluid, an injection fluid, or a combination thereof.

13. The method of claim 1, wherein the metal carbonate surface modifier is selected from the group consisting of phosphonate carboxylates.

14. A method of servicing a wellbore in a subterranean formation comprising: modifying a permeability of at least a portion of the wellbore and/or subterranean formation by placing components of a wellbore servicing fluid in the wellbore and/or subterranean formation, wherein the components comprise a hydrophobically modified relative permeability modifier, a metal carbonate surface modifier selected from the group consisting of zinc acetate, silicates, phosphonate carboxylates, and combinations thereof, and an aqueous base fluid, wherein the hydrophobically modified relative permeability modifier is present in the wellbore servicing fluid in an amount of from about 0.01 weight percent (wt %) to about 10 wt %; the metal carbonate surface modifier is present in the wellbore servicing fluid in an amount of from about 0.001 wt % to about 1 wt %; and the aqueous base fluid is present in the wellbore servicing fluid in an amount of from about 40 wt % to about 99.8 wt %, based on the total weight of the wellbore servicing fluid; wherein the hydrophobically modified relative permeability modifier comprises poly (alkyldimethylammoniumethyl methacrylate), and wherein the formation comprises a metal carbonate; and allowing the wellbore servicing fluid to modify the permeability of at least a portion of the wellbore and/or subterranean formation.

15. A method of servicing a wellbore in a subterranean formation comprising:
modifying a permeability of at least a portion of the wellbore and/or subterranean formation by introducing components of a wellbore servicing fluid into the subterranean formation via the wellbore, wherein the subterranean formation comprises a metal carbonate, and wherein the wellbore servicing fluid comprises:
an aqueous base fluid,
a hydrophobically modified relative permeability modifier, and
a metal carbonate surface modifier selected from the group consisting of zinc acetate, silicates, phosphonate carboxylates, and combinations thereof, wherein the hydrophobically modified relative permeability modifier is present in the wellbore servicing fluid in an amount of from about 0.01 weight percent (wt %) to about 10 wt %; the metal carbonate surface modifier is present in the wellbore servicing fluid in an amount of from about 0.001 wt % to about 1 wt %; and the aqueous base fluid is present in the wellbore servicing fluid in an amount of from about 40 wt % to about 99.8 wt %, based on the total weight of the wellbore servicing fluid; and
allowing the wellbore servicing fluid to modify the permeability of at least a portion of the wellbore and/or subterranean formation via interaction of the metal carbonate surface modifier with the wellbore and/or subterranean formation and the hydrophobically modified relative permeability modifier.

16. The method of claim 15, wherein the hydrophobically modified relative permeability modifier comprises a hydrophobically modified polymer selected from the group consisting of hydrophobically modified poly(dimethylaminoethyl methacrylate), hydrophobically modified poly(dimethylaminopropyl methacrylamide), poly(alkyldimethylammoniumethyl methacrylate), poly(octadecyldimethylammoniumethyl methacrylate), poly(hexadecyldimethylammoniumethyl methacrylate), poly(octadecyldimethylammoniumethyl methacrylamide), poly(hexadecyldimethylammoniumpropyl methacrylamide), acrylamide/octadecyldimethylammommethyl methacrylate bromide copolymer, dimethylaminoethyl methacrylate/vinyl pyrrolidone/hexadecyldimethylammoniumethyl methacrylate bromide terpolymer, acrylamide/2-acrylamido-2-methyl propane sulfonic acid/2-ethylhexyl methacrylate terpolymer, amino methacrylate/alkyl amino methacrylate copolymer, dimethylaminoethyl methacrylate/alkyldimethyl ammoniumethyl methacrylate copolymer, dimethylaminoethyl methacrylate/hexadecyldimethylammoniumethyl methacrylate copolymer, dimethylaminoethyl methacrylatelhexadecyldimethyl ammoniumethyl methacrylate bromide copolymer, dimethylammoniumethyl methacrylate/cetyldimethylammomumethyl methacrylate copolymer, dimethylaminoethyl acrylate/acrylate/alkyldimethylmoniumethyl acrylate copolymer, and compounds characterized by Structure I:

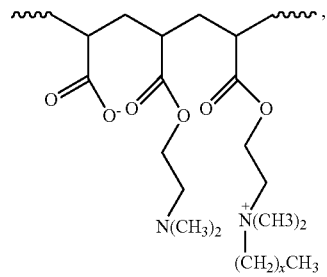

Structure I wherein x is in a range of from about 6 to about 22, and combinations thereof.

17. The method of claim 15, wherein the wellbore servicing fluid reduces a permeability to water of the at least the portion of the wellbore and/or subterranean formation by more than the wellbore servicing fluid reduces a permeability to oil of the at least the portion of the wellbore and/or subterranean formation.

18. The method of claim 15, wherein the subterranean formation comprises a metal carbonate.

19. The method of claim 15, wherein introducing the components of the wellbore servicing fluid in the wellbore and/or subterranean formation comprises introducing the metal carbonate surface modifier into the wellbore and/or subterranean formation prior to and/or simultaneously with introducing the hydrophobically modified relative permeability modifier into the wellbore and/or subterranean formation.

* * * * *